Figure 1:
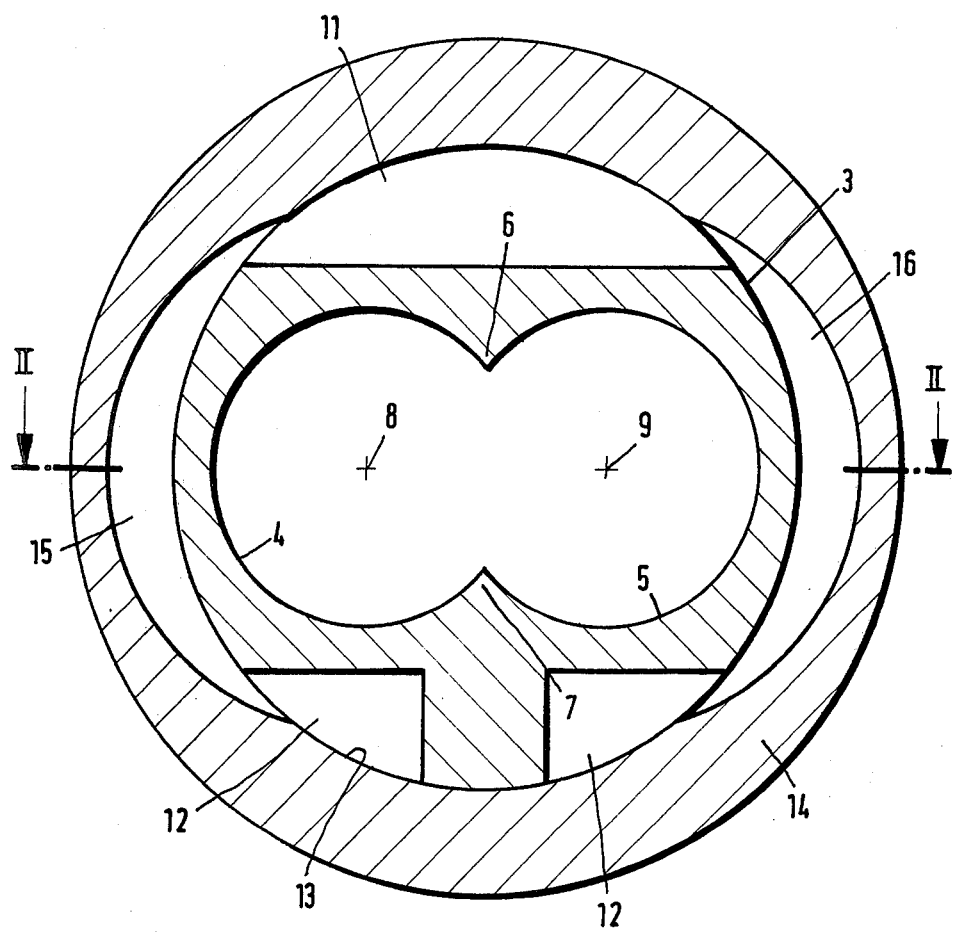

United States Patent [19]

Herbert et al.

[11] 4,127,331
[45] Nov. 28, 1978

[54] TWIN SCREW EXTRUDERS

[75] Inventors: Adolf Herbert; Wilhelm Brand, both of Hanover; Manfred Dienst, Burgdorf, all of Fed. Rep. of Germany

[73] Assignee: Hermann Berstorff Maschinenbau GmbH, Hannover Kleefeld, Fed. Rep. of Germany

[21] Appl. No.: 861,001

[22] Filed: Dec. 15, 1977

[30] Foreign Application Priority Data

Dec. 27, 1976 [DE] Fed. Rep. of Germany ....... 2659037

[51] Int. Cl.$^2$ .............................................. B29F 3/02
[52] U.S. Cl. .................................................... 366/83
[58] Field of Search ....................... 366/83, 84, 85, 86, 366/88; 425/204, 209, 380

[56] References Cited

U.S. PATENT DOCUMENTS

| 1,356,691 | 10/1920 | Bowen | 366/83 X |
| 3,468,518 | 9/1969 | Koch | 366/84 X |
| 3,856,278 | 12/1974 | Eisenmann | 366/88 X |

Primary Examiner—Edward J. McCarthy
Attorney, Agent, or Firm—Beall & Jeffery

[57] ABSTRACT

A twin screw extruder comprising a cylinder having twin bores therein to receive the twin screw of the extruder and a circular casing with at least one passage to permit heating or cooling fluid to flow between the cylinder and the casing, in which the cylinder has a generally circular outside contour with a first set of grooves and a second set of grooves forming parts of said at least one passage, extending obliquely to the longitudinal axis of the cylinder and formed in the outer surface of the cylinder, the bottom walls of the grooves extending parallel to a plane which includes the two longitudinal axes of the twin bores with the first set of grooves lying on one side of said plane, and the second set of grooves lying on the other side of said plane, the inclination of said first set of grooves to said axis being opposite to the inclination of said second set of grooves to said axis, and the inside of the casing containing spaced recesses forming further parts of said at least one passage and, except for end ones of said recesses, each connecting one end of a respective one of the grooves of the first set of grooves to one end of a respective one of the grooves of the second set of grooves.

2 Claims, 2 Drawing Figures

TWIN SCREW EXTRUDERS

The invention relates to twin screw extruders comprising a cylinder having twin bores therein to receive the twin screw and enclosed by a cylindrical casing, with at least one passage to allow heating or cooling fluid to flow between the cylinder and the casing.

A difficulty encountered in the heating or cooling of cylinders in twin screw extruders where the bores partially overlap, is that the portions of the cylinder which absorb the greatest quantity of heat per unit are inwardly directed wedge-shaped projections at the sides of the region where the twin bores overlap. Such wedge-shaped projections can be cooled adequately only with a large technical outlay.

In previously proposed twin screw extruders, the cylinder enclosing the twin screw is in extended form, i.e. it is constructed with two flat outer faces each extending parallel with the plane in which the axes of the twin bores lie. This cylinder, which is difficult to produce in its basic shape, has a helical groove cut into its periphery, to guide the heating or cooling fluid around the cylinder in a helical path. The cylinder is surrounded by a circular casing and the gaps between the upper and lower surfaces of the cylinder and the inner wall of the casing are filled with separate chordal segments. Such a twin screw extruder is expensive to manufacture and it is difficult to maintain a seal between the cylinder and the segments.

The invention has among its objects to provide a twin screw extruder of the above described kind wherein positive guidance of the heating or cooling fluid is obtained at relatively low manufacturing cost using favourably shaped basic components.

According to the invention there is provided a twin screw extruder comprising a cylinder having twin bores therein to receive the twin screw of the extruder and a circular casing, with at least one passage to permit heating or cooling fluid to flow between the cylinder and the casing, in which the cylinder has a generally circular outside contour with a first set of grooves and a second set of grooves forming parts of said at least one passage, extending obliquely to the longitudinal axis of the cylinder and formed in the outer surface of the cylinder, the bottom walls of the grooves extending parallel to a plane which includes the two longitudinal axes of the twin bores with the first set of grooves lying on one side of said plane, and the second set of grooves lying on the other side of said plane, the inclination of said first set of grooves to said axis being opposite to the inclination of said second set of grooves to said axis, and the inside of the casing containing spaced recesses forming further parts of said at least one passage and, except for end ones of said recesses, each connecting one end of a respective one of the grooves of the first set of grooves to one end of a respective one of the grooves of the second set of grooves.

Preferably an inlet orifice, through which the heating or cooling fluid is supplied to said at least one passage, and an outlet orifice, through which the heating or cooling fluid is exhausted from said at least one passage, are provided in respective ones of said end ones of said recesses.

With such a construction both the casing and the cylinder can be machined from circular section billets and the grooves and recesses can be cut with milling cutters in simple machining operations. The circular cylinder lies in the circular bore in the casing with a sealing action. The machining of the casing and cylinder does not pose any severe manufacturing problems.

The heating or cooling fluid is thus positively guided in said at least one passage between the cylinder and the casing in a helical path without any great outlay in manufacture.

Figure 2:
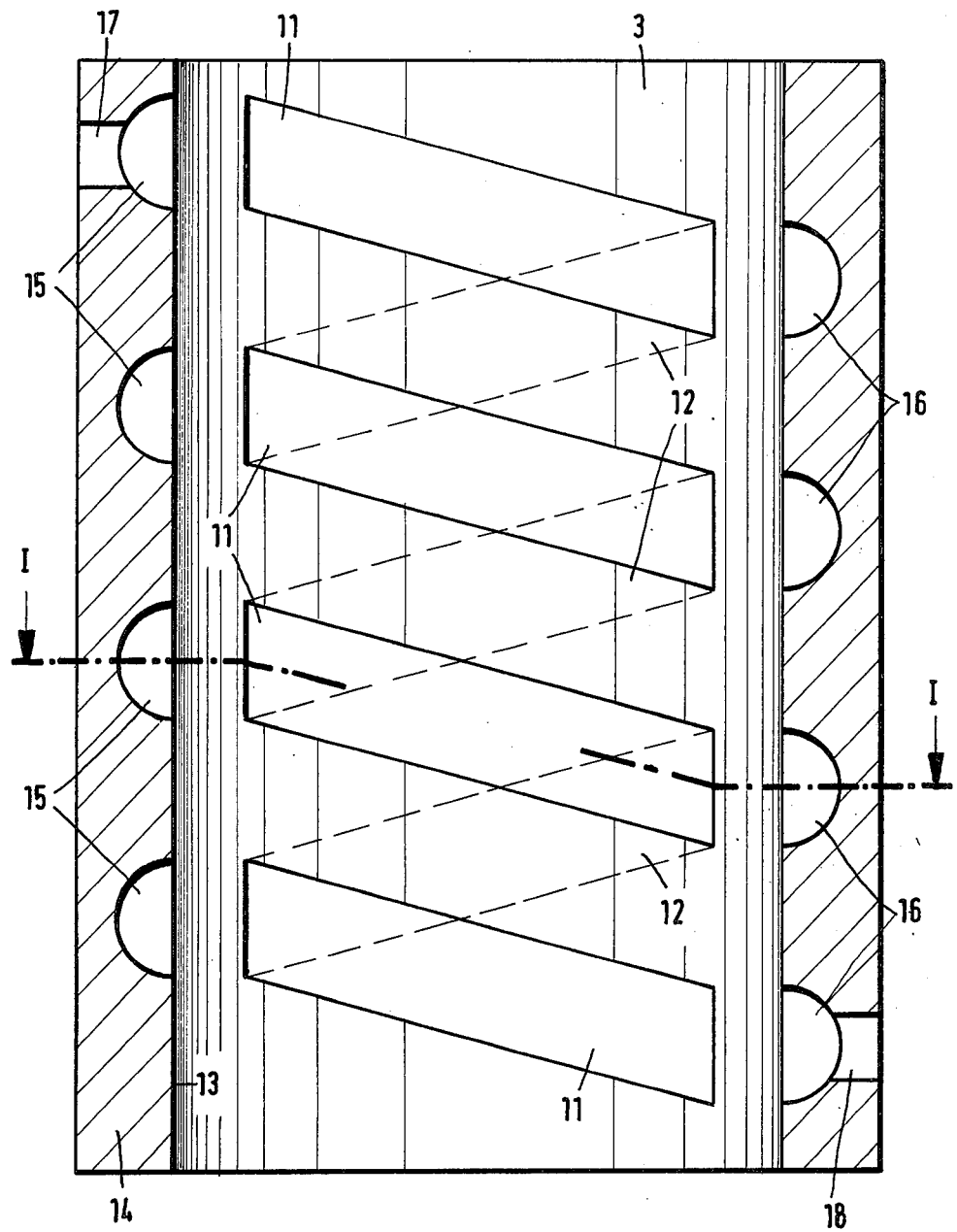

The invention is diagrammatically illustrated by way of example in in the accompanying drawings, in which:

FIG. 1 is a cross-section through the cylinder and casing of a portion of a twin screw extruder according to the invention, taken along line I—I of FIG. 2; and FIG. 2 is a plan view of the apparatus of FIG. 1 with the casing shown in a cross-section taken along line II—II of FIG. 1.

Referring to the drawings, a twin cylinder 3, which surrounds a twin screw (not shown) over part of its length, has a generally circular outside contour. The cylinder 3 is provided with two internal parallel cylinder bores 4 and 5 which partially overlap and form two wedge-shaped projections 6 and 7 from the inner wall of the cylinder 3.

Parallel with and above the plane in which axes 8 and 9 of the bores 4 and 5 respectively lie, grooves 11 extending obliquely to the longitudinal axis of the cylinder 3 are cut into the outer face of the cylinder 3. Parallel with and below the plane of the axes 8, 9, grooves 12, again inclined obliquely to the longitudinal axis of the cylinder 3 are cut into the outer surface of the cylinder 3. The inclination of the lower grooves 12 to the longitudinal axis of the cylinder 3 is opposite to that of the upper grooves 11. Except at the ends of the cylinder 3, each end of each upper groove 11 lies vertically above a respective end of one of the lower grooves 12.

The cylinder 3 is fitted into a circular inner bore 13 in a cylindrical casing 14. Diametrically opposed and axially offset recesses 15, 16 of an arcuate shape are provided in the inner wall of the casing 14. As can be seen from FIG. 1, each recess 15, 16 provides communication between one end of a respective one of the upper grooves 11 and one end of a respective one of the lower grooves 12. In this way the heating and cooling fluid is guided around the cylinder 3 in a helical path. An inlet port 17 for the supply of the heating or cooling fluid is provided at one end of the casing 14. An outlet port 18 for the discharge of the heating or cooling fluid is provided at the other end of the casing 14. The inlet port 17 and outlet port 18 are located in the axially outermost recess 15, 16 respectively in the casing 14.

The heating or cooling fluid flows around the cylinder 3 while the wall thickness of the cylinder 3 remains approximately constant. With the apparatus illustrated the heating or cooling fluid can effectively heat or cool the wedge-shaped projections 6 and 7 from the inner wall of the cylinder 3.

What is claimed is:

1. A twin screw extruder comprising a cylinder, having twin bores therein to receive the twin screw of the extruder, and a circular casing, with a passage to permit temperature control fluid to flow between the cylinder and the casing, in which said cylinder has its outer surface of a generally circular contour but formed to present a first set of grooves and a second set of grooves, forming parts of said passage and extending obliquely to the longitudinal axis of said cylinder, the bottom wall of said grooves extending parallel to a plane which includes the longitudinal axes of said twin bores with said first set of grooves lying on one side of said plane, and said second set of grooves lying on the other side of said plane, the inclination of said first set of grooves to said axis being opposite to the inclination of said second set of grooves to said axis, and the inside of said casing being formed to present spaced recesses forming further parts of said passage and, except for end ones of said recesses, each connecting one end of a respective one of the grooves of said first set of grooves to one end of a respective one of the grooves of said second set of grooves.

2. A twin screw extruder as claimed in claim 1, further comprising an inlet orifice, through which said temperature control fluid is supplied to said passage, and an outlet orifice, through which said temperature control fluid is exhausted from said passage, are provided in a respective one of said end ones of said recesses.

* * * * *